(12) United States Patent
Brittan et al.

(10) Patent No.: US 6,708,153 B2
(45) Date of Patent: Mar. 16, 2004

(54) VOICE SITE PERSONALITY SETTING

(75) Inventors: Paul St. John Brittan, Claverham (GB); Robert Francis Squibbs, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/189,156

(22) Filed: Jul. 2, 2002

(65) Prior Publication Data

US 2003/0036906 A1 Feb. 20, 2003

Related U.S. Application Data

(63) Continuation of application No. 10/005,904, filed on Dec. 4, 2001.

(30) Foreign Application Priority Data

Dec. 5, 2000 (GB) ............................................. 0029576

(51) Int. Cl.[7] ............................................. G10L 13/02
(52) U.S. Cl. .................... 704/260; 704/270; 709/218; 379/88.01
(58) Field of Search ............................ 379/88.01, 88.03, 379/88.22; 704/235, 246, 260, 270, 275; 709/200, 203, 218

(56) References Cited

U.S. PATENT DOCUMENTS

| | | | |
|---|---|---|---|
| 5,899,975 A | 5/1999 | Nielsen | 704/260 |
| 5,915,001 A * | 6/1999 | Uppaluru | 379/88.22 |
| 6,144,938 A * | 11/2000 | Surace et al. | 704/257 |
| 6,269,336 B1 * | 7/2001 | Ladd et al. | 704/270 |
| 6,334,103 B1 * | 12/2001 | Surace et al. | 704/257 |

FOREIGN PATENT DOCUMENTS

| | | |
|---|---|---|
| EP | 0 848 373 | 6/1998 |
| WO | 99/05613 | 2/1999 |
| WO | 99/57714 | 11/1999 |
| WO | 01/91109 | 11/2001 |

OTHER PUBLICATIONS

"Introduction and Overview of W3C Speech Interface Framework", W3C Working Draft, 21 pages (Sep. 11, 2000).

VoiceXML Forum Version 1.00, 101 pages (Mar. 7, 2000).

* cited by examiner

*Primary Examiner*—Daniel Abebe

(57) ABSTRACT

A method is provided of setting the voice personality of a voice service site. A user browsing a voice web visits a voice site where the voice output of the site is presented using a set of voice personality characterisers with which the user is particularly comfortable. The user, in subsequently transferring to another voice service site, opts to have the voice personality that was embodied in the set of voice personality characterisers used by the site being left, transfer with the user to the new site. This transfer will typically be subject to permissions set by both the site being left and the site about to be visited.

37 Claims, 3 Drawing Sheets

VOICE SITE PERSONALITY SETTING

This is a continuation application of copending U.S. patent application Ser. No. 10/005,904, filed on Dec. 4, 2001, which is incorporated herein by reference.

FIELD OF THE INVENTION

The present invention relates to the setting of the voice personality of a voice service site.

BACKGROUND OF THE INVENTION

In recent years there has been an explosion in the number of services available over the World Wide Web on the public internet (generally referred to as the "web"), the web being composed of a myriad of pages linked together by hyperlinks and delivered by servers on request using the HTTP protocol. Each page comprises content marked up with tags to enable the receiving application (typically a GUI browser) to render the page content in the manner intended by the page author; the markup language used for standard web pages is HTML (HyperText Markup Language).

However, today far more people have access to a telephone than have access to a computer with an Internet connection. Sales of cellphones are outstripping PC sales so that many people have already or soon will have a phone within reach where ever they go. As a result, there is increasing interest in being able to access web-based services from phones. 'Voice Browsers' offer the promise of allowing everyone to access web-based services from any phone, making it practical to access the Web any time and any where, whether at home, on the move, or at work.

Voice browsers allow people to access the Web using speech synthesis, pre-recorded audio, and speech recognition. FIG. 1 of the accompanying drawings illustrates the general role played by a voice browser. As can be seen, a voice browser is interposed between a user 2 and a voice page server 4. This server 4 holds voice service pages (text pages) that are marked-up with tags of a voice-related markup language (or languages). When a page is requested by the user 2, it is interpreted at a top level (dialog level) by a dialog manager 7 of the voice browser 3 and output intended for the user is passed in text form to a Text-To-Speech (TTS) converter 6 which provides appropriate voice output to the user. User voice input is converted to text by speech recognition module 5 of the voice browser 3 and the dialog manager 7 determines what action is to be taken according to the received input and the directions in the original page. The voice input/output interface can be supplemented by keypads and small displays.

In general terms, therefore, a voice browser can be considered as a largely software device which interprets a voice markup language and generate a dialog with voice output, and possibly other output modalities, and/or voice input, and possibly other modalities (this definition derives from a working draft, dated September 2000, of the Voice browser Working Group of the World Wide Web Consortium).

Voice browsers may also be used together with graphical displays, keyboards, and pointing devices (e.g. a mouse) in order to produce a rich "multimodal voice browser". Voice interfaces and the keyboard, pointing device and display maybe used as alternate interfaces to the same service or could be seen as being used together to give a rich interface using all these modes combined.

Some examples of devices that allow multimodal interactions could be multimedia PC, or a communication appliance incorporating a display, keyboard, microphone and speaker/headset, an in car Voice Browser might have display and speech interfaces that could work together, or a Kiosk.

Some services may use all the modes together to provide an enhanced user experience, for example, a user could touch a street map displayed on a touch sensitive display and say "Tell me how I get here?". Some services might offer alternate interfaces allowing the user flexibility when doing different activities. For example while driving speech could be used to access services, but a passenger might used the keyboard.

FIG. 2 of the accompanying drawings shows in greater detail the components of an example voice browser for handling voice pages 15 marked up with tags related to four different voice markup languages, namely:

- tags of a dialog markup language that serves to specify voice dialog behaviour;
- tags of a multimodal markup language that extends the dialog markup language to support other input modes (keyboard, mouse, etc.) and output modes (large and small screens);
- tags of a speech grammar markup language that serve to specify the grammar of user input; and
- tags of a speech synthesis markup language that serve to specify voice characteristics, types of sentences, word emphasis, etc.

When a page 15 is loaded into the voice browser, dialog manager 7 determines from the dialog tags and multimodal tags what actions are to be taken (the dialog manager being programmed to understand both the dialog and multimodal languages 19). These actions may include auxiliary functions 18 (available at any time during page processing) accessible through APIs and including such things as database lookups, user identity and validation, telephone call control etc. When speech output to the user is called for, the semantics of the output is passed, with any associated speech synthesis tags, to output channel 12 where a language generator 23 produces the final text to be rendered into speech by text-to-speech converter 6 and output to speaker 17. In the simplest case, the text to be rendered into speech is fully specified in the voice page 15 and the language generator 23 is not required for generating the final output text; however, in more complex cases, only semantic elements are passed, embedded in tags of a natural language semantics markup language (not depicted in FIG. 2) that is understood by the language generator. The TTS converter 6 takes account of the speech synthesis tags when effecting text to speech conversion for which purpose it is cognisant of the speech synthesis markup language 25.

The way the synthesized voice sounds (which is referred to herein as the 'voice personality' since the synthesized voice can be made to imitate a particular person) depends on an implicit or explicit set of characterisers 30 of the process used for voice synthesis. Thus, if the voice output is synthesised using a voie tract model, then the characterisers setting the voice personality are the parameters of the model; alternatively, if the voice output is synthesised by the concatenation of digitised voice elements such as phonemes, allophones, diphones or the like, then these elements (which may have been derived from a particular celebrity) constitute the characterisers of the voice personality.

User voice input is received by microphone 16 and supplied to an input channel of the voice browser. Speech recogniser 5 generates text which is fed to a language understanding module 21 to produce semantics of the input for passing to the dialog manager 7. The speech recogniser 5 and language understanding module 21 work according to specific lexicon and grammar markup language 22 and, of course, take account of any grammar tags related to the current input that appear in page 15. The semantic output to the dialog manager 7 may simply be a permitted input word or may be more complex and include embedded tags of a natural language semantics markup language. The dialog manager 7 determines what action to take next (including, for example, fetching another page) based on the received user input and the dialog tags in the current page 15.

Any multimodal tags in the voice page 15 are used to control and interpret multimodal input/output.

Whatever its precise form, the voice browser can be located at any point between the user and the voice page server. FIGS. 3 to 5 illustrate three possibilities in the case where the voice browser functionality is kept all together; many other possibilities exist when the functional components of the voice browser are separated and located in different logical/physical locations.

In FIG. 3, the voice browser 3 is depicted as incorporated into an end-user system 8 (such as a PC or mobile entity) associated with user 2. In this case, the voice page server 4 is connected to the voice browser 3 by any suitable data-capable bearer service extending across one or more networks 9 that serve to provide connectivity between server 4 and end-user system 8. The data-capable bearer service is only required to carry text-based pages and therefore does not require a high bandwidth.

FIG. 4 shows the voice browser 3 as co-located with the voice page server 4. In this case, voice input/output is passed across a voice network 9 between the end-user system 8 and the voice browser 3 at the voice page server site. The fact that the voice service is embodied as voice pages interpreted by a voice browser is not apparent to the user or network and the service could be implemented in other ways without the user or network being aware.

In FIG. 5, the voice browser 3 is located in the network infrastructure between the end-user system 8 and the voice page server 4, voice input and output passing between the end-user system and voice browser over one network leg, and voice-page text data passing between the voice page server 4 and voice browser 3 over another network leg. This arrangement has certain advantages; in particular, by locating expensive resources (speech recognition, TTS converter) in the network, they can be used for many different users with user profiles being used to customise the voice-browser service provided to each user.

Voice-based services are highly attractive because of their ease of use. However, the reaction of users to different voice output personalities can vary widely—one voice personality can encourage a certain class of users whilst alienating a different class.

It is an object of the present invention to provide a method and apparatus by which voice services can be presented to users with voice personalities with which the user is comfortable.

SUMMARY OF THE INVENTION

According to one aspect of the present invention, there is provided a method of setting the voice personality of a voice service site, wherein the voice personality characterisers associated with a previously-visited voice service site are used in presenting the voice output of a currently-visited voice service site.

Typically, the voice service sites operate by serving, from voice page servers, voice pages in the form of text with embedded voice markup tags to a voice browser, the voice browser interpreting these pages and carrying out speech recognition of user voice input, text to speech conversion to generate voice output, and dialog management; the voice browser being disposed between voice page servers and the user. In this case, it is the browser that manages which set of voice personality characterisers is used in rendering a particular voice page.

The voice personality characterisers preferably have associated usage permissions regarding what sites can use the characterisers. Voice service sites may also specify whether external voice personality characterisers can be used for presenting the voice output of the site.

According to another aspect of the present invention, there is provided apparatus comprising:

voice-service access means for accessing different voice service sites;

voice-service presentation means for presenting the output from an accessed voice service site using a voice set by a selected set of voice personality characterisers; and selection means for selecting the set of voice personality characterisers to be used by the voice-service presentation means to present the currently accessed site, the selection means being operative to enable a set of voice personality characterisers associated with a previously-accessed voice service site to be selected for use in presenting a currently-visited voice service site.

According to a further aspect of the present invention, there is provided a server site holding sets of voice personality characterisers for imparting particular voice personalities to the presentation of the output of voice service sites, said sets having associated usage permissions regarding use of the sets in presenting voice sites.

BRIEF DESCRIPTION OF THE DRAWINGS

A method and apparatus embodying the invention will now be described, by way of non-limiting example, with reference to the accompanying diagrammatic drawings, in which.

BEST MODE OF CARRYING OUT THE INVENTION

In the following description, voice services are described based on voice page servers serving pages with embedded voice markup tags to voice browsers. Unless otherwise indicated, the foregoing description of voice browsers, and their possible locations and access methods is to be taken as applying also to the described embodiments of the invention. Furthermore, although voice-browser based forms of voice services are preferred, the present invention in its widest conception, is not limited to these forms of voice service system and other suitable systems will be apparent to persons skilled in the art.

Figure 6:
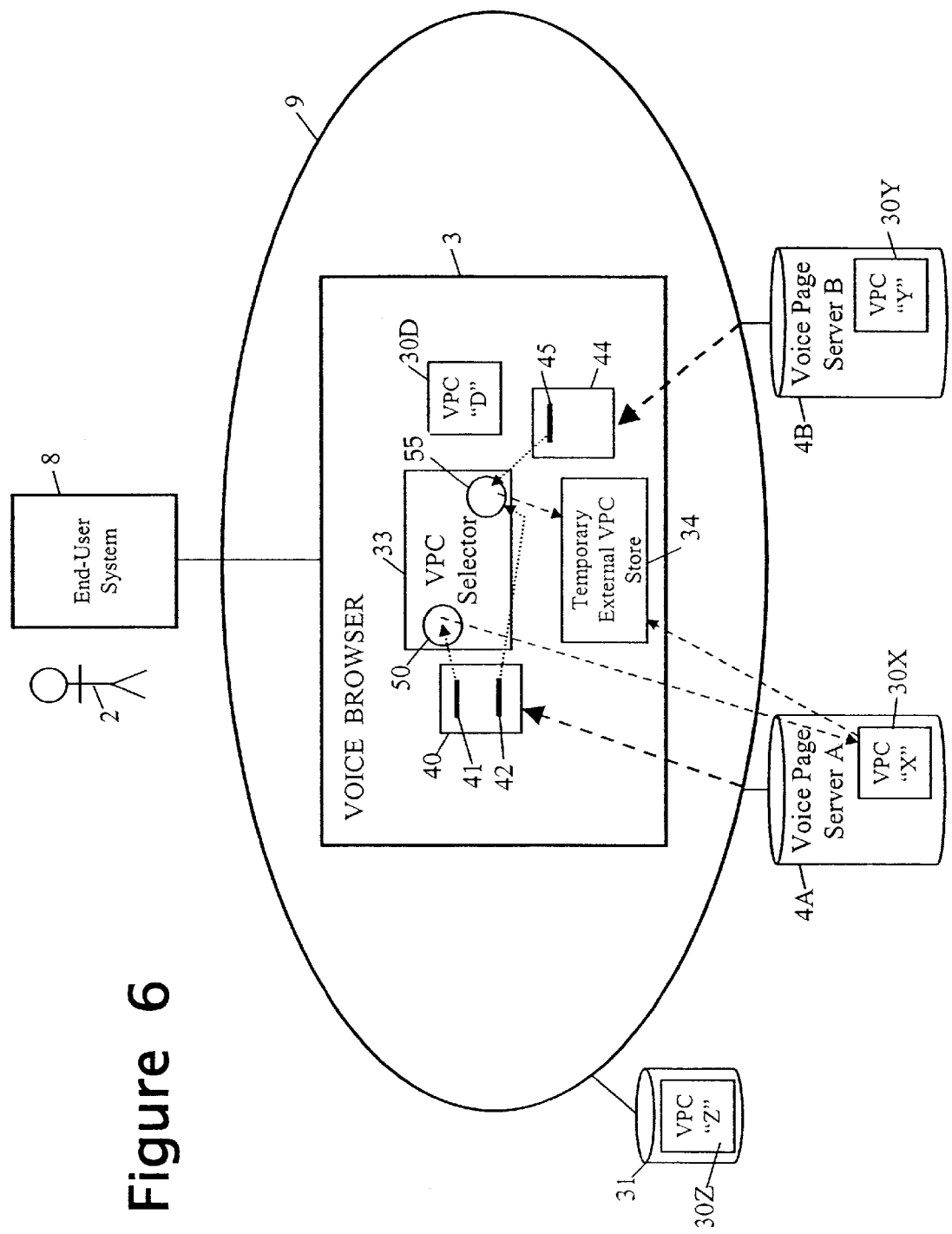
FIG. 6 is a diagram of an embodiment of the invention in which the same voice personality is used by two different voice services.

In FIG. 6, a user 2 is depicted as using equipment 8 to browse a voice web, represented by voice page servers 4A and 4B, with the aid of a voice browser 3 located in the communications infrastructure 9 (though it may be located anywhere for present purposes).

Figure 1:
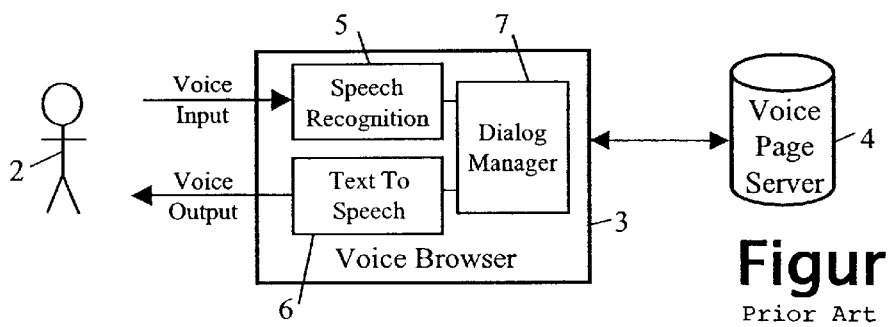
FIG. 1 is a diagram illustrating the role of a voice browser.
Figure 3:
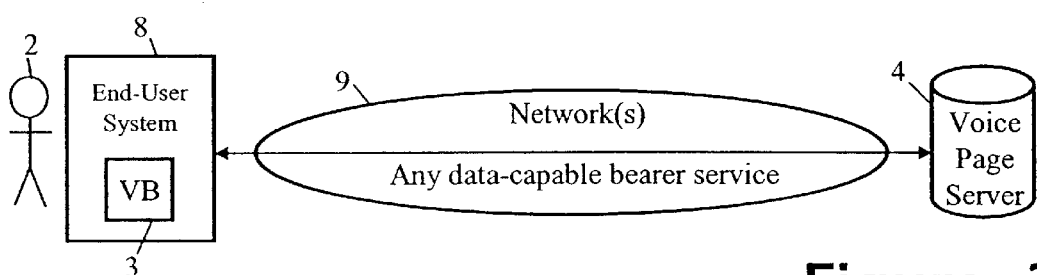
FIG. 3 is a diagram showing a voice service implemented with voice browser functionality located in an end-user system.
Figure 4:
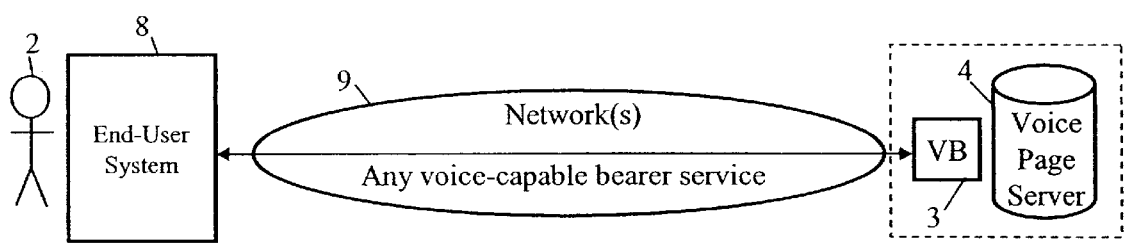
FIG. 4 is a diagram showing a voice service implemented with voice browser functionality co-located with a voice page server.
Figure 5:
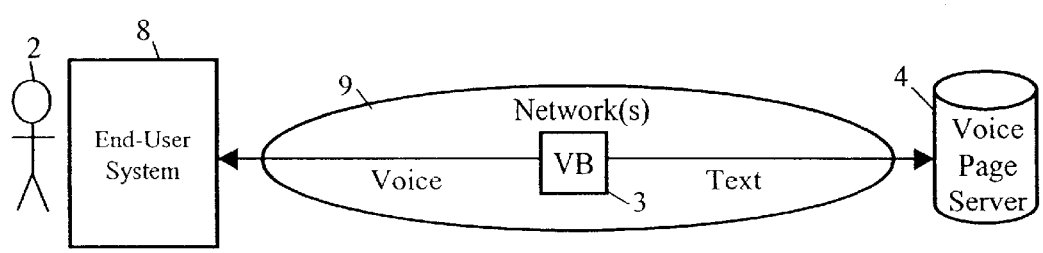
FIG. 5 is a diagram showing a voice service implemented with voice browser functionality located in a network between the end-user system and voice page server.
Figure 2:
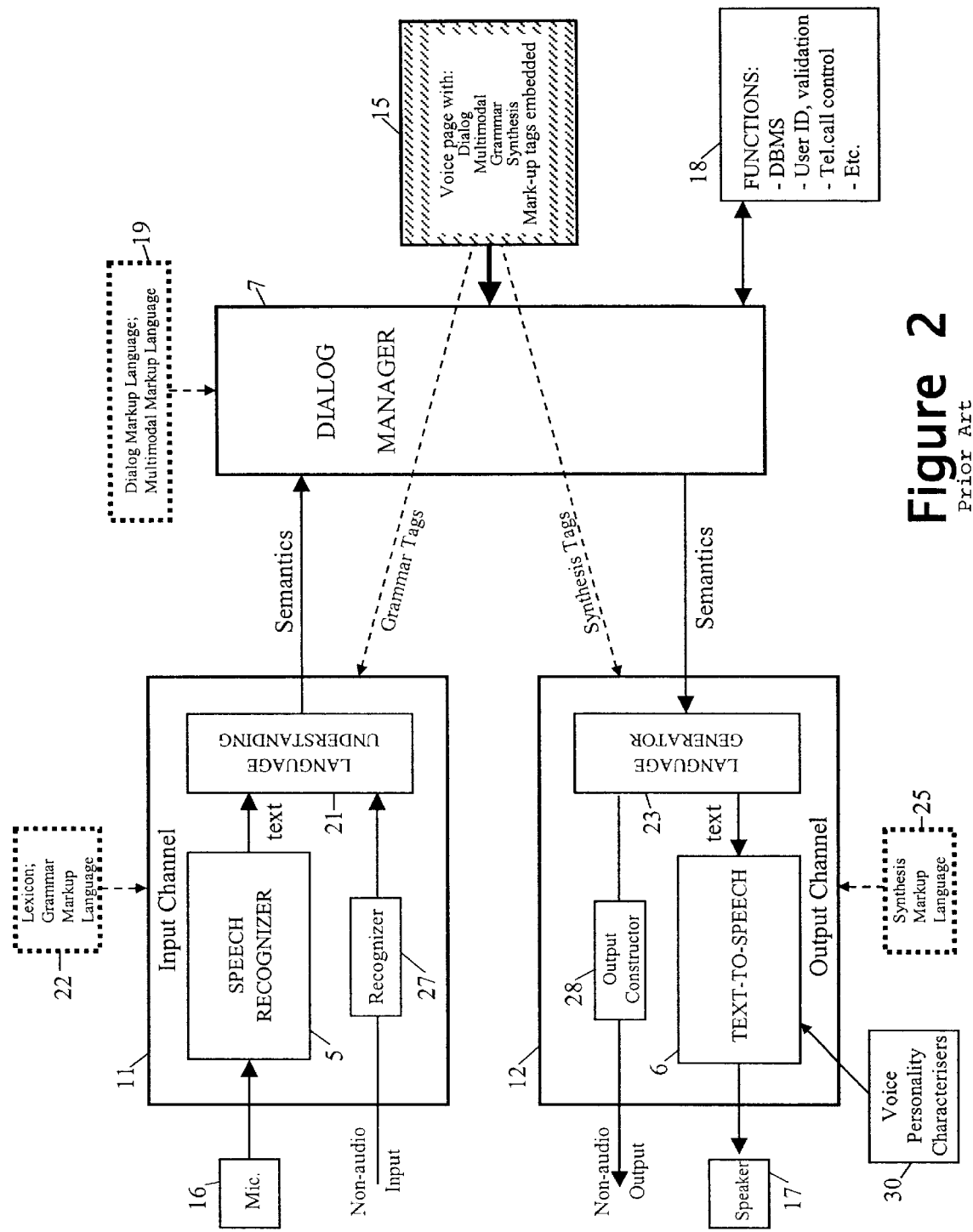
FIG. 2 is a diagram showing the functional elements of a voice browser and their relationship to different types of voice markup tags.

The voice browser 3 includes a selector 33 for selecting between available sets of voice personality characteristics (abbreviated to 'VPC' below) 30, the selected set being supplied to the text-to-speech converter 6 (FIG. 2) of the browser to condition the voice output of the page currently being processed by the browser. The selected VPC set imparts, for example, a celebrity voice personality to the page output. FIG. 6 shows four VPC sets, namely: a default VPC set 30D held by the browser and used when no other VPC set is available or desired (the default VPC set can be one specified by the user 2); a respective VPC set 30X and 30Y associated with voice page servers 4A and 4B; and an independent VPC set 30Z hosted on a third party server 31.

When voice browser 3 receives a voice page for interpretation, the VPC selector 33 checks to see if the page specifies the use of any particular VPC set; if it does not then the default VPC set 30D is selected. If a particular VPC set is specified then VPC selector, possibly after confirming with the user, retrieves the specified VPC set to store 34 and notifies the TTS converter 6 that it should use this VPC set in rendering the page.

Thus, with reference to the FIG. 6 example, user 2 browses to voice page 40 which is served by server 4A to the voice browser 3. The head portion of page 40 includes a link line 41 identifying VPC set 30X as the one to be used (this link includes the URL of the set). VPC selector 33 recognises this reference and selects the corresponding VPC set 30X over the default VPC set 30D (see decision circle 50 in FIG. 6). VPC set 30X is then retrieved from server 4A and saved to the store 34 from where it is used by TTS converter 6 in preference to the default VPC set 30D.

In due course, the user activates a hyperlink 42 on page 40 to fetch a page 44 from voice page server 4B. This page 44 has a VPC link 45 in its head portion that references VPC set 30Y. However, the hyperlink 42 on page 40 includes an attribute which indicates that the VPC set 30X can also be used with page 44. The VPC selector 33 takes note of this and is therefore required to select between VPC set 30X and VPC set 30Y on reading the link 45 in page 44. The selection (see decision circle 55) can be effected by consulting the user, or by automatically favouring the VPC specified in the calling page 40 or the called page 44. In the present case, it is assumed that the VPC set 30X is selected so that the output from voice page 44 is now rendered with the same voice personality as was used for voice page 40. The permission given by the attribute in hyperlink 42 for the use of VPC set 30X in respect of page 44 is treated as being specific to that page (and possibly other pages on the same site) so when the user hyperlinks from page 44 to a yet further page on a different server (not shown), the option of using VPC set 30X ceases to be available to selector 33.

An example scenario showing the benefits of using the foregoing mechanism will now be given. Imagine that the user 2 is browsing the voice site (on server 40A) of a well known celebrity cookery chef to find a receipt for an evening meal. The feel of the voice site is familiar to the user from the television program hosted by the celebrity, containing many familiar background cookery sounds and noises. The voice output of the site (effectively the site "host") is presented in the voice of the celebrity, this being the voice personality represented by VPC set 30X. User 2 can interact with the 'host', querying receipts, ingredients and cooking methods.

At some point during user's visit to the voice site, the user decides to buy the list of ingredients for a chosen dish. The 'host' recommends a well known shopping store, where it just so happens there is a series of special offers to all visitors from the celebrity's cookery voice site.

User 2 chooses to visit to the shopping store, by voice hyper-linking (hyperlink 42) to the shop's voice site (on server 40B), and requests the celebrity chef to accompany them through the shop. During this visit to the shop's voice site, the user hears all the distinctive sounds of the particular shop, as well as the voice of the celebrity (VPC set 30X is still being used) suggesting ingredients and other items the user may like to buy. On successfully purchasing the desired goods, the user asks the celebrity to take the user back to the original voice site and help the user in cooking the meal.

At any time during the user's visit to the store site, the user is given the option of saying goodbye to the celebrity host in and, instead, to be guided by the shop's assistant; in this case, the VPC selector retrieves VPC set 30Y, saves it to store 34, and instructs the TTS converter to use set 30Y for further speech output from server 40B.

The foregoing arrangement offers the user the advantages of a familiar voice to guide and recommend products or services, and the resultant reassurance is of benefit both the the user and the store.

Since voice personalities, particularly of celebrities, have value but can also be misleading if wrongly used, it is useful to provide for a variety of mechanisms for ensuring proper use of the VPC sets when the latter are retrievable by voice browsers independently of the pages with which they are intended to be used. Thus, for example:

(a) each VPC set can have associated permissions specifying what pages it can be used with (including, possibly, a generic page provided it is accompanied by an authorisation accepted by the VPC set);

(b) a page can have associated permissions that mandates or permits the use of a particular VPC set or a VPC set selected from a category of VPC sets;

(c) a page can have associated permissions that mandate that a particular VPC set of class of VPC set is NOT used (this could be done if either a particular VPC set is only suggested or no set is proposed at all);

(d) a hyperlink in a page can have associated permissions similar to permissions in (b) and/or (c).

It is the role of the VPC selector to determine what VPC set or sets can be used having regard to all the permissions associated with the VPC sets, calling page and called page. Regardless of the stated permissions, the VPC selector 33 always has the right to choose the default VPC set 30D of the browser.

Many other variants are, of course, possible to the arrangement described above with reference to FIG. 6. For example, a voice site can opt to use a VPC set 30Z provided by a third-party server 31 assuming that this is permitted by the party controlling use of the set 30Z.

Furthermore, each set of voice personality characterisers can have respective associated phrasing style data specifying a particular sentential speaking style matching the voice personality. The phrasing style data is retrieved by the voice browser when retrieving the corresponding set of voice personality characterisers, and is used to control the text generated by language generator 23 (see FIG. 2) when expressing the semantic meaning specified in a current voice page.

What is claimed is:

1. A method of setting the voice personality of a voice service site, wherein a set of voice personality characterisers associated with a previously-visited voice service site is used in presenting the voice output of a currently-visited voice service site, wherein the voice service sites operate by serving, from voice page servers, voice pages in the form of text with embedded voice markup tags to a voice browser, the voice browser interpreting these pages and carrying out speech recognition of user voice input, text to speech conversion to generate voice output, and dialog management; the voice browser being disposed between voice page servers and the user and managing which set of voice personality characterisers is used during the text to speech conversion and wherein the set of voice personality characterisers has associated permissions regarding use of the set for presenting the voice output of voice sites; the voice browser reading and complying with these permissions.

2. A method according to claim 1, wherein text to speech conversion at the voice browser is effected using a voice tract model, said voice personality characterisers being parameter values of this model.

3. A method according to claim 1, wherein text to speech conversion at the voice browser is effected by the concatenation of speech elements such as phonemes, allophones, diphones or the like, these latter forming said voice personality characterisers.

4. A method according to claim 1, wherein the re-use of the voice personality characterisers from the previously-visited site with the currently-visited site is subject to user opt-in or opt-out.

5. A method according to claim 1, wherein phrasing style data is associated with said set of voice personality characterisers, the voice browser using this phrasing style data to generate text, for subsequent conversion to voice output, that expresses a specified semantic meaning in a particular style matched with the voice personality defined by the voice personality characterisers.

6. A method of setting the voice personality of a voice service site wherein a set of voice personality characterisers associated with a previously-visited voice service site is used in presenting the voice output of a currently-visited voice service site, wherein the voice service sites operate by serving, from voice page servers, voice pages in the form of text with embedded voice markup tags to a voice browser, the voice browser interpreting these pages and carrying out speech recognition of user voice input, text to speech conversion to generate voice output, and dialog management; the voice browser being disposed between voice page servers and the user and managing which set of voice personality characterisers is used during the text to speech conversion and wherein the previously-visited site specifies permissions regarding use of the voice personality characterisers associated with the site, for presenting the voice output of other sites; the voice browser reading and complying with these permissions.

7. A method according to claim 6, wherein text to speech conversion at the voice browser is effected using a voice tract model, said voice personality characterisers being parameter values of this model.

8. A method according to claim 6, wherein text to speech conversion at the voice browser is effected by the concatenation of speech elements such as phonemes, allophones, diphones or the like, these latter forming said voice personality characterisers.

9. A method according to claim 6, wherein the re-use of the voice personality characterisers from the previously-visited site with the currently-visited site is subject to user opt-in or opt-out.

10. A method according to claim 6, wherein phrasing style data is associated with said set of voice personality characterisers, the voice browser using this phrasing style data to generate text, for subsequent conversion to voice output, that expresses a specified semantic meaning in a particular style matched with the voice personality defined by the voice personality characterisers.

11. A method of setting the voice personality of a voice service site wherein a set of voice personality characterisers associated with a previously-visited voice service site is used in presenting the voice output of a currently-visited voice service site, wherein the voice service sites operate by serving, from voice page servers, voice pages in the form of text with embedded voice markup tags to a voice browser, the voice browser interpreting these pages and carrying out speech recognition of user voice input, text to speech conversion to generate voice output, and dialog management; the voice browser being disposed between voice page servers and the user and managing which set of voice personality characterisers is used during the text to speech conversion and wherein the currently-visited site specifies permissions regarding the use of sets of voice personality characterisers associated with other sites, for presenting the voice output of said currently visited site; the voice browser reading and complying with these permissions.

12. A method according to claim 11, wherein text to speech conversion at the voice browser is effected using a voice tract model, said voice personality characterisers being parameter values of this model.

13. A method according to claim 11, wherein text to speech conversion at the voice browser is effected by the concatenation of speech elements such as phonemes, allophones, diphones or the like, these latter forming said voice personality characterisers.

14. A method according to claim 11, wherein the re-use of the voice personality characterisers from the previously-visited site with the currently-visited site is subject to user opt-in or opt-out.

15. A method according to claim 11, wherein phrasing style data is associated with said set of voice personality characterisers, the voice browser using this phrasing style data to generate text, for subsequent conversion to voice output, that expresses a specified semantic meaning in a particular style matched with the voice personality defined by the voice personality characterisers.

16. Apparatus comprising:
   voice-service access means for accessing different voice service sites:
   voice-service presentation means for presenting the output from an accessed voice service site using a voice set by a selected set of voice personality characterisers: and
   selection means for selecting the set of voice personality characterisers to be used by the voice-service presentation means to present the currently accessed site, the selection means being operative to enable a set of voice personality characterisers associated with a previously-accessed voice service site to be selected for use in presenting a currently-visited voice service site and wherein the selection means includes means for reading and complying with usage restrictions associated with a set of voice personality characterisers.

17. Apparatus according to claim 16, in the form of a voice browser for handling voice pages comprising text with embedded voice markup tags, the voice-service presentation means comprising a text-to-speech converter for generating voice output according to the selected set of voice personality characterisers.

18. Apparatus according to claim 17, wherein the text-to-speech converter is of a type that uses concatenation of speech elements such as phonemes, allophones, diphones or the like, these latter forming said voice personality characterisers.

19. Apparatus according to claim 17, wherein the text-to-speech converter is of a type using a voice tract model, said voice personality characterisers being parameter values of this model.

20. Apparatus according to claim 16, wherein the voice browser includes a language generator arranged to use phrasing style data associated with the selected set of voice personality characterisers to generate text, for subsequent conversion to voice output by the text-to-speech converter, that expresses a specified semantic meaning in a particular style associated matched with a voice personality defined by the selected set of voice personality characterisers.

21. Apparatus comprising:
voice-service access means for accessing different voice service sites;
voice-service presentation means for presenting the output from an accessed voice service site using a voice set by a selected set of voice personality characterisers; and
selection means for selecting the set of voice personality characterisers to be used by the voice-service presentation means to present the currently accessed site, the selection means being operative to enable a set of voice personality characterisers associated with a previously-accessed voice service site to be selected for use in presenting a currently-visited voice service site and wherein the selection means includes means for receiving and complying with usage restrictions provided by a voice service site in respect of a set of voice personality characterisers associated with the site, these usage restrictions concerning usage of that set of voice personality characterisers for presenting the voice output of other sites.

22. Apparatus according to claim 21, in the form of a voice browser for handling voice pages comprising text with embedded voice markup tags, the voice-service presentation means comprising a text-to-speech converter for generating voice output according to the selected set of voice personality characterisers.

23. Apparatus according to claim 22, wherein the text-to-speech converter is of a type using a voice tract model, said voice personality characterisers being parameter values of this model.

24. Apparatus according to claim 22, wherein the text-to-speech converter is of a type that uses concatenation of speech elements such as phonemes, allophones, diphones or the like, these latter forming said voice personality characterisers.

25. Apparatus according to claim 21, wherein the voice browser includes a language generator arranged to use phrasing style data associated with the selected set of voice personality characterisers to generate text, for subsequent conversion to voice output by the text-to-speech converter, that expresses a specified semantic meaning in a particular style associated matched with a voice personality defined by the selected set of voice personality characterisers.

26. Apparatus comprising:
voice-service access means for accessing different voice service sites;
voice-service presentation means for presenting the output from an accessed voice service site using a voice set by a selected set of voice personality characterisers; and
selection means for selecting the set of voice personality characterisers to be used by the voice-service presentation means to present the currently accessed site, the selection means being operative to enable a set of voice personality characterisers associated with a previously-accessed voice service site to be selected for use in presenting a currently-visited voice service site and wherein the selection means is operative to read and comply with usage permissions provided by a currently-visited site regarding the use of sets of voice personality characterisers associated with other sites, for presenting the voice output of said currently visited site.

27. Apparatus according to claim 26, in the form of a voice browser for handling voice pages comprising text with embedded voice markup tags, the voice-service presentation means comprising a text-to-speech converter for generating voice output according to the selected set of voice personality characterisers.

28. Apparatus according to claim 27, wherein the text-to-speech converter is of a type using a voice tract model, said voice personality characterisers being parameter values of this model.

29. Apparatus according to claim 27, wherein the text-to-speech converter is of a type that uses concatenation of speech elements such as phonemes, allophones, diphones or the like, these latter forming said voice personality characterisers.

30. Apparatus according to claim 26, wherein the voice browser includes a language generator arranged to use phrasing style data associated with the selected set of voice personality characterisers to generate text, for subsequent conversion to voice output by the text-to-speech converter, that expresses a specified semantic meaning in a particular style associated matched with a voice personality defined by the selected set of voice personality characterisers.

31. Apparatus comprising:
voice-service access means for accessing different voice service sites;
voice-service presentation means for presenting the output from an accessed voice service site using a voice set by a selected set of voice personality characterisers; and
selection means for selecting the set of voice personality characterisers to be used by the voice-service presentation means to present the currently accessed site, the selection means being operative to enable a set of voice personality characterisers associated with a previously-accessed voice service site to be selected for use in presenting a currently-visited voice service site; and
user input means for controlling whether a set of voice personality characterisers from a previously-accessed site is re-used with the currently-accessed site.

32. Apparatus according to claim 31, in the form of a voice browser for handling voice pages comprising text with embedded voice markup tags, the voice-service presentation means comprising a text-to-speech converter for generating voice output according to the selected set of voice personality characterisers.

33. Apparatus according to claim 32, wherein the text-to-speech converter is of a type using a voice tract model, said voice personality characterisers being parameter values of this model.

34. Apparatus according to claim 32, wherein the text-to-speech converter is of a type that uses concatenation of speech elements such as phonemes, allophones, diphones or the like, these latter forming said voice personality characterisers.

35. Apparatus according to claim 31, wherein the voice browser includes a language generator arranged to use phrasing style data associated with the selected set of voice personality characterisers to generate text, for subsequent conversion to voice output by the text-to-speech converter, that expresses a specified semantic meaning in a particular style associated matched with a voice personality defined by the selected set of voice personality characterisers.

36. A server site holding sets of voice personality characterisers for imparting particular voice personalities to the presentation of the output of voice service sites, said sets having associated usage permissions regarding use of the sets in presenting voice sites.

37. A server site according to claim 36, wherein the said usage permissions associated with a said set of voice personality characterisers, specify what voice services are permitted to use that set of voice personality characterisers.

* * * * *